(12) United States Patent
Rifkah et al.

(10) Patent No.: US 9,071,733 B2
(45) Date of Patent: Jun. 30, 2015

(54) METHOD FOR REDUCING IMAGE OR VIDEO NOISE

(75) Inventors: Eva Rifkah, Montreal (CA); Aishy Amer, St-Laurent (CA)

(73) Assignee: VALORBEC, SOCIETE EN COMMANDITE, Montreal, Quebec (CA)

( * ) Notice: Subject to any disclaimer, the term of this patent is extended or adjusted under 35 U.S.C. 154(b) by 256 days.

(21) Appl. No.: 13/812,579

(22) PCT Filed: Jul. 29, 2011

(86) PCT No.: PCT/CA2011/050470
§ 371 (c)(1),
(2), (4) Date: Jan. 28, 2013

(87) PCT Pub. No.: WO2012/012907
PCT Pub. Date: Feb. 2, 2012

(65) Prior Publication Data
US 2013/0128123 A1 May 23, 2013

Related U.S. Application Data

(60) Provisional application No. 61/368,693, filed on Jul. 29, 2010.

(51) Int. Cl.
*G06K 9/40* (2006.01)
*H04N 5/21* (2006.01)
*G06T 5/00* (2006.01)

(52) U.S. Cl.
CPC *H04N 5/21* (2013.01); *G06T 5/002* (2013.01); *G06T 2207/10016* (2013.01); *G06T 2207/20012* (2013.01); *G06T 2207/20192* (2013.01)

(58) Field of Classification Search
None
See application file for complete search history.

(56) References Cited

U.S. PATENT DOCUMENTS

| | | | |
|---|---|---|---|
| 6,885,762 | B2 | 4/2005 | Saha et al. |
| 7,272,265 | B2 | 9/2007 | Kouri et al. |
| 7,352,911 | B2 | 4/2008 | Maurer |
| 7,508,334 | B2 | 3/2009 | Allen et al. |
| 7,570,832 | B2 | 8/2009 | Chui et al. |
| 2004/0075659 | A1* | 4/2004 | Taubin ............... 345/428 |
| 2005/0036558 | A1 | 2/2005 | Dumitras et al. |
| 2005/0213841 | A1 | 9/2005 | Linguraru et al. |
| 2007/0110294 | A1 | 5/2007 | Schaap et al. |
| 2008/0007747 | A1 | 1/2008 | Chinen et al. |
| 2008/0025633 | A1 | 1/2008 | Szeliski |

OTHER PUBLICATIONS

Perona and Malik, "Scale Space and Edge Detection Using Anisotropic Diffusion", IEEE 1990.*
Perona and Malik "Anisotropic Diffusion" Springer 1994.*
Rifkah et al "Fast Automated Stopping-Time and Edge-Strength Estimation for Anisotropic Diffusion" IEEE 2008.*

(Continued)

*Primary Examiner* — Mark Roz
(74) *Attorney, Agent, or Firm* — Norton Rose Fulbright Canada LLP

(57) ABSTRACT

There is described a Minimal Iterativity Anisotropic Diffusion (MIAD) approach that estimates the required number of iterations N as a function of the image structure-under-noise $\rho$ and the bound of the noise $\eta$. The time step $\lambda$ is related to the image structure-under-noise $\rho$ and to the bound of noise $\lambda$. The stopping time is calculated using $T = \lambda \cdot N$, and the edge strength $\sigma$ is determined as a function of T, $\eta$, and $\rho$.

20 Claims, 20 Drawing Sheets

(56) References Cited

OTHER PUBLICATIONS

Luo et al., "Coupled anisotropic diffusion for image selective smoothing", Signal Processing, vol. 86, Issue 7, Jul. 2006, pp. 1728-1736, 2006.

Borisenko et al., "A diffusion filtering method for image processing", Programming and Computer Software, vol. 30, No. 5, Sep. 2004, pp. 273-277, 2004.

Qi Duan et al., "Assessment of visual quality and spatial accuracy of fast anisotropic diffusion and scan conversion algorithms for real-time threedimensional spherical ultrasound", Medical Imaging 2004: Ultrasonic Imaging and Signal Processing. Proceedings of the SPIE, vol. 5373, pp. 331-342 (2004).

Fischl et al., "Adaptive nonlocal filtering: a fast alternative to anisotropic diffusion for image enhancement", IEEE transactions on Pattern analysis and machine intelligence, vol. 21, No. 1, Jan. 1999, pp. 42-48, 1999.

\* cited by examiner

METHOD FOR REDUCING IMAGE OR VIDEO NOISE

CROSS-REFERENCE TO RELATED APPLICATIONS

This application claims priority under 35 U.S.C. §119(e) from U.S. Provisional Patent Application No. 61/368,693, filed on Jul. 29, 2010, the contents of which are hereby incorporated by reference.

TECHNICAL FIELD

The present invention relates to the field of image or video processing, and particularly to noise reduction in images or videos using anisotropic diffusion methods.

BACKGROUND OF THE ART

While using anisotropic diffusion for reducing image noise, a parameterized family of successive increasingly noise reduced images is generated from an original noisy image. The image of each scale is a combination between the image of the previous scale and a filter that depends on the global content of the original image. As a consequence, anisotropic diffusion is a non-linear and space-invariant transformation of the original image. Most anisotropic diffusion methods focus on the estimation of the number of iterations N required to achieve an optimal denoising. However, these techniques are iterative and require heavy computations.

Therefore there is a need for an improved anisotropic diffusion method for reducing image or video noise.

SUMMARY

There is described a Minimal Iterativity Anisotropic Diffusion (MIAD) approach that estimates the required number of iterations N as a function of the image structure-under-noise $\rho$ and the bound of the noise $\eta$. The time step $\lambda$ is related to the image structure-under-noise $\rho$ and to the bound of noise $\lambda$. The stopping time is calculated using T=$\lambda \cdot$N, and the edge strength $\sigma$ is determined as a function of T, $\eta$, and $\rho$.

The MIAD works well for both high and low noise. With an optimal estimation of T and dependency between T and $\sigma$, different values of N<$N_{max}$ and $\lambda$=T/N do not significantly affect the output PSNR. A nearly optimal PSNR is achieved regardless of the choice of N<$N_{max}$. This is because we first choose N suitable to noise and image structure, then estimate $\lambda$ as a function of $\rho$, calculate T, and finally estimate $\sigma$.

In simulations, it was shown that the method described herein achieves visually and objectively better results than the prior art while its computational cost is by far less and is nearly constant. In particular, the method is adaptive, fully automated, and does not blur, which makes it appropriate as a pre-processing step, for example, in video object segmentation or in compression.

In accordance with a first broad aspect, there is provided a method for reducing noise in an image/video frame, comprising: receiving an input image/video frame and a corresponding noise level $\eta$; determining a structure-under-noise estimator $\rho$ as a function of a ratio between the noise level $\eta$ and a structure measure parameter for the input image/video frame; determining a number of iterations N and a time step parameter $\lambda$ from the structure-under-noise estimator $\rho$; determining a stopping time parameter T from the number of iterations N and the time step parameter $\lambda$; determining an edge strength parameter $\sigma$ from the structure-under-noise estimator $\rho$, the noise level $\eta$, and the stopping time parameter T; denoising the input image/video frame by applying anisotropic diffusion thereto using the edge strength parameter $\sigma$, the time step parameter $\lambda$, and the number of iterations N, thereby obtaining a denoised image; and outputting the denoised image.

In accordance with a second broad aspect, there is provided a system for reducing noise in an image/video frame having a corresponding noise level $\eta$, the system comprising: a memory; a processor coupled to the memory; a parameter determining module stored on the memory and executable by the processor, the parameter determining module having program code that when executed, determines a structure-under-noise estimator $\rho$ as a function of a ratio between the noise level $\eta$ and a structure measure parameter for the input image/video frame, determines a number of iterations N and a time step parameter $\lambda$ from the structure-under-noise estimator $\rho$; determines a stopping time parameter T from the number of iterations N and the time step parameter $\lambda$, and determines an edge strength parameter $\sigma$ from the structure-under-noise estimator $\rho$, the noise level $\eta$, and the stopping time parameter T; and a noise reduction module stored on the memory and executable by the processor, the noise reduction module having program code that when executed, denoises the input image/video frame by applying anisotropic diffusion thereto using the edge strength parameter $\sigma$, the time step parameter $\lambda$, and the number of iterations N, thereby obtaining a denoised image, and outputs the denoised image.

DETAILED DESCRIPTION

Figure 1:
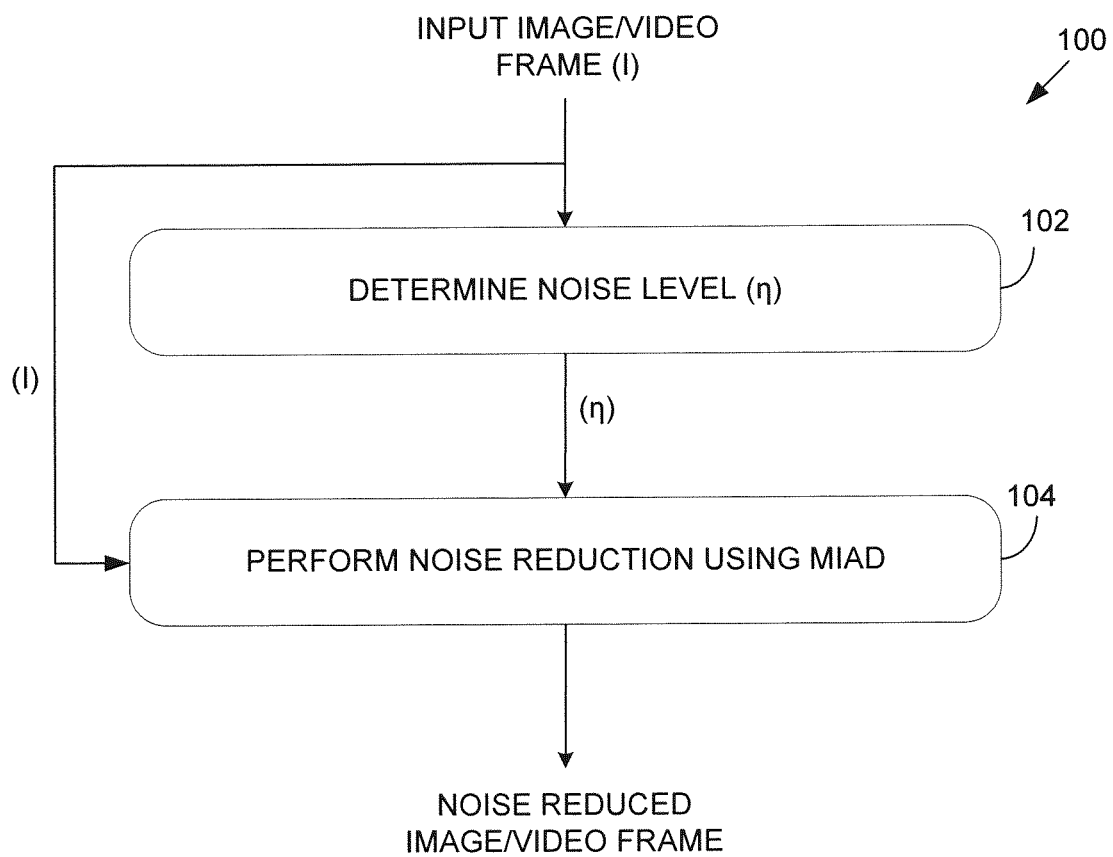
FIG. 1 is a flowchart of a method for denoising an image, in accordance with one embodiment.

FIG. 1 illustrates a process 100 of noise reduction in images and/or video frames. In a first step 102, an input image/video frame I is received and noise estimation is performed thereon to obtain a value for signal noise η. Any known method of estimating noise η may be used. Noise η can be found using the peak signal-to-noise ratio (PSNR) of I, and:

$$PSNR \approx \frac{1}{\eta^2} \quad (1)$$

The two values are set to deviate by no more than 3 dB in order to determine a suitable noise level. In a subsequent step 104, the noise η is applied to a minimal iterativity anisotropic diffusion (MIAD) technique described in more detail below.

In order to achieve the method and system described herein, anisotropic diffusion (AD) and the dependencies between its parameters were studied using stopping time (or the time step and the number of iterations), edge strength, and image noise. It was found that the time step and edge strength are inversely proportional to the number of iterations performed during the AD process, and proportional to the input noise. In addition, the amount of image structure plays an important role to estimate these parameters. The objective was minimal iterativity while improving the performance for image noise reduction. This was achieved by synchronization of the diffusion parameters.

AD, as a partial differential equation (PDE), is a flexible method providing the possibility of controlling the filtering process of an image depending on location, direction, and time.

AD was derived from the general continuous diffusion equation:

$$\partial_t I = \text{div}(G \cdot \nabla I); \quad 1 \le t \le T, \quad (2)$$

where I is the image, t is the scale, T is the stopping time, ∇I is the image gradient, div is the divergence operator, and G is the diffusion coefficient. Depending on G, we differentiate linear diffusion, where G is a constant and (2*) reduces to the heat equation, and anisotropic diffusion, where G is a function of the image content.

A direct simple discretization of equation (2*), based on a Euler scheme, is the following AD model:

$$I_s^{n+1} = I_s^n + \lambda \sum_{p \in W} G(\nabla I_p^n, \sigma) \cdot \nabla I_p^n; \quad (3)$$

$$1 \le n \le N,$$

where s is the center pixel, n is the current scale, N is the number of iterations, $I_s^n$ is the image intensity at s and n, $I_s^{n+1}$ is the next-scale version of $I^n$, $I^0$ is the input noisy image, and $\nabla I_p = (I_p - I_s)$ is the image gradient in direction p∈W. |W| is the number of nearest neighbors along which AD is computed. Often W={North, South, East, West}, however a higher number of neighbors can also be used.

$G(\nabla I_p, \sigma)$ is the edge-stopping function in the direction p, while σ is the edge strength to control the shape of G(•). G(•) should approach zero when at edges, i.e., $\nabla I_p$ is high, and approaches one at homogeneous areas, i.e., $\nabla I_p \to 0$.

The time step (or stability parameter) λ is responsible for the stability of the difference equation in (3). T and N are related through, $$T = N \cdot \lambda. \quad (4)$$

The flexibility of AD lies in the possibility of controlling the diffusion process depending on location, direction, and time. MIAD efficiently and effectively relates N, T, λ, and σ of the AD model in equation (3). A nearly optimal noise reduction gain may thus be achieved with minimal computational cost while avoiding blurring. This makes the method suitable for subsequent structure-sensitive image processing tasks such as image segmentation. To adapt the AD parameters to the image content, the image "structure-under-noise" is determined via the ratio between noise and the median absolute deviation from the median of the image gradient (MAD).

G(•) in (3) is responsible for regulating the diffusion at edges, and thus implicitly detecting these edges. Some known edge-stopping functions are the Perona and Malik, the Lorentzian, the Tukey, the Weickert, and the L1-L2 functions:

$$G_{PM}(\nabla I_p, \sigma) = e^{-\left(\frac{\nabla I_p}{\sigma}\right)^2}. \quad (5)$$

$$G_{Lor}(\nabla I_p, \sigma) = \frac{1}{1 + \left(\frac{\nabla I_p}{\sigma}\right)^2}. \quad (6)$$

$$G_{Tuk}(\nabla I_p, \sigma) = \begin{cases} \frac{1}{2}\left[1 - \left(\frac{\nabla I}{\sigma}\right)^2\right]^2 : & |\nabla I| \le \sigma \\ 0: & \text{otherwise.} \end{cases} \quad (7)$$

$$G_{Wick}(\nabla I_p, \sigma) = 1 - e^{-\left(\frac{\nabla I_p}{\sigma}\right)^4}; c_1 = -2.33667. \quad (8)$$

$$G_{L1L2}(\nabla I_p, \sigma) = \frac{1}{\sqrt{1 + \frac{(\nabla I)^2}{c_2}}}; c_2 = 1. \quad (9)$$

The performance of edge-stopping functions differs depending on the sharpness of their slopes, the width of their shapes, and if they approach zero: a) the sharper the slope is, the faster G(•) goes to zero, i.e., the more G(•) is responsive to edges; b) the wider G(•) is, the less sensitive to high structure it will be; and c) if G(•) approaches zero and its slope is sharp, the detected edges are not accurate.

The MIAD method described herein uses its own proposed stopping time T and edge strength σ. The approach consists in first estimating the required number of iterations N adaptive to the image structure-under-noise ρ and the bound of the noise η. Then the time step λ is related to ρ and to the bound of $\lambda_{max}$. The stopping time is then calculated by T=λ·N, followed by an estimation of the edge strength σ adaptive to T, to η, and to ρ.

Figure 2:
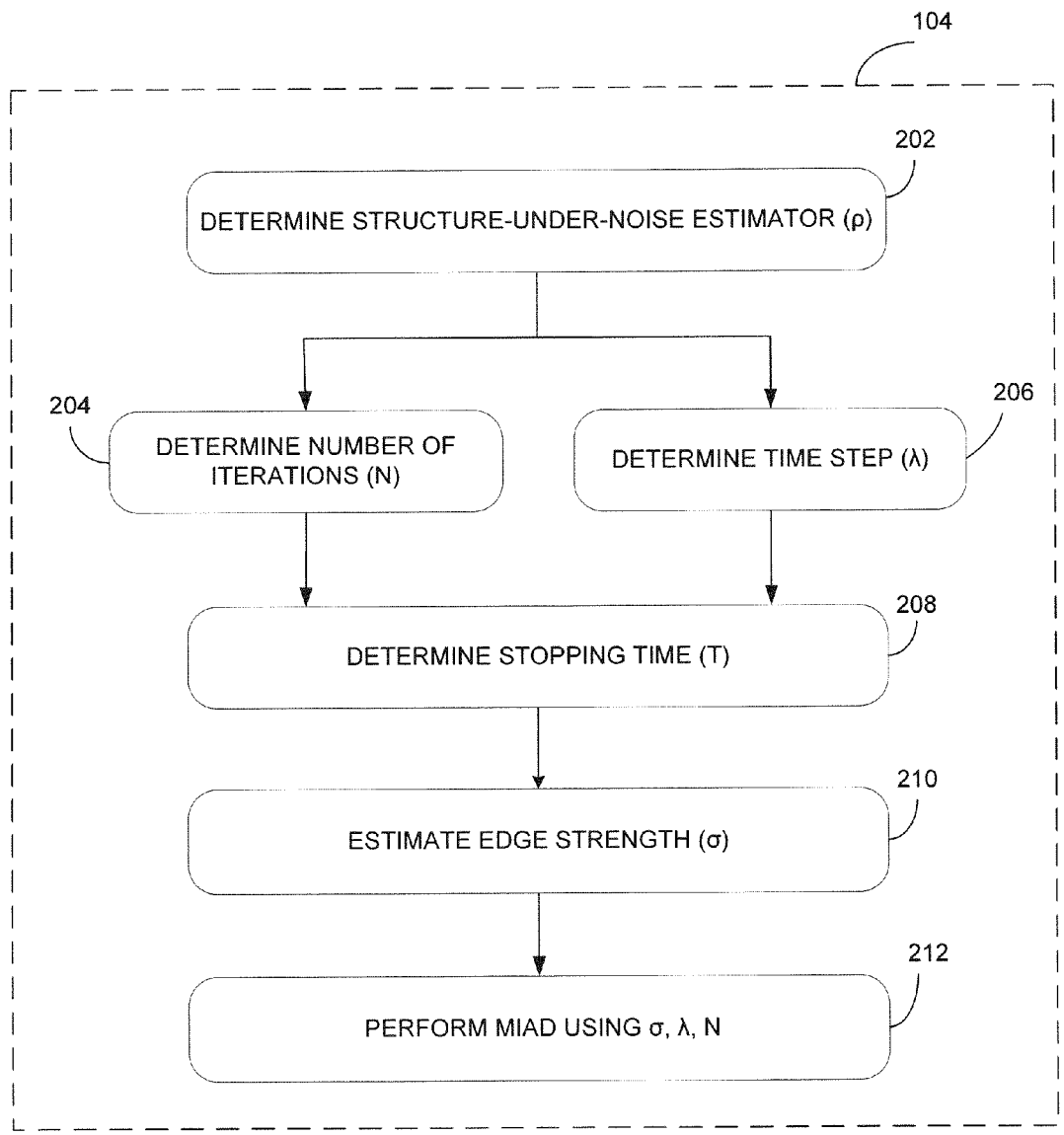
FIG. 2 is a flowchart of the noise reduction step of FIG. 1, in accordance with one embodiment.

FIG. 2 is a flowchart that illustrates step 104 of FIG. 1 in more detail, in accordance with one embodiment. The first step 202 is the determination of the structure-under-noise ratio ρ. This ratio is used to account for both noise and structure in the image.

The median absolute deviation of the image gradient MAD is a robust estimator that can be used to estimate the image structure. However, considering noise, the MAD does not accurately reflect a noise-free image structure. For low structure images, the MAD increases faster with noise than for high structure images. This is because the image structure hides the added noise (which is in accordance with the human perception of noise, i.e., the total perceived noisiness in an image decreases in high frequencies). Table 1 compares the increase of MAD under noise (from the noise-free case to 20 dB PSNR) for selected test images illustrated in FIGS. 3a-3m.

TABLE 1

| | 20 dB | 25 dB | 30 dB | 35 dB | 40 dB | Noise-free |
|---|---|---|---|---|---|---|
| $MAD_{fig\_3J}$ | 24.41 | 13.70 | 7.69 | 4.29 | 2.37 | 0.00 |
| $MAD_{fig\_3B}$ | 25.63 | 15.06 | 9.20 | 6.09 | 4.52 | 3.00 |
| $MAD_{fig\_3H}$ | 29.90 | 20.93 | 15.95 | 13.17 | 12.18 | 11.50 |
| $MAD_{fig\_3I}$ | 33.44 | 25.28 | 21.21 | 19.60 | 19.09 | 19.00 |

Therefore, to account for both noise and image structure, a structure-under-noise estimator ρ is used to represent the ratio between the estimated noise standard deviation and the MAD, $$\rho = \frac{\eta}{MAD} \quad (10)$$

The maximum value of ρ is approximately one. MAD is defined by:

$$MAD = \text{median}(PVI - \text{median}(PVIP)P) \quad (11)$$

Figure 4:
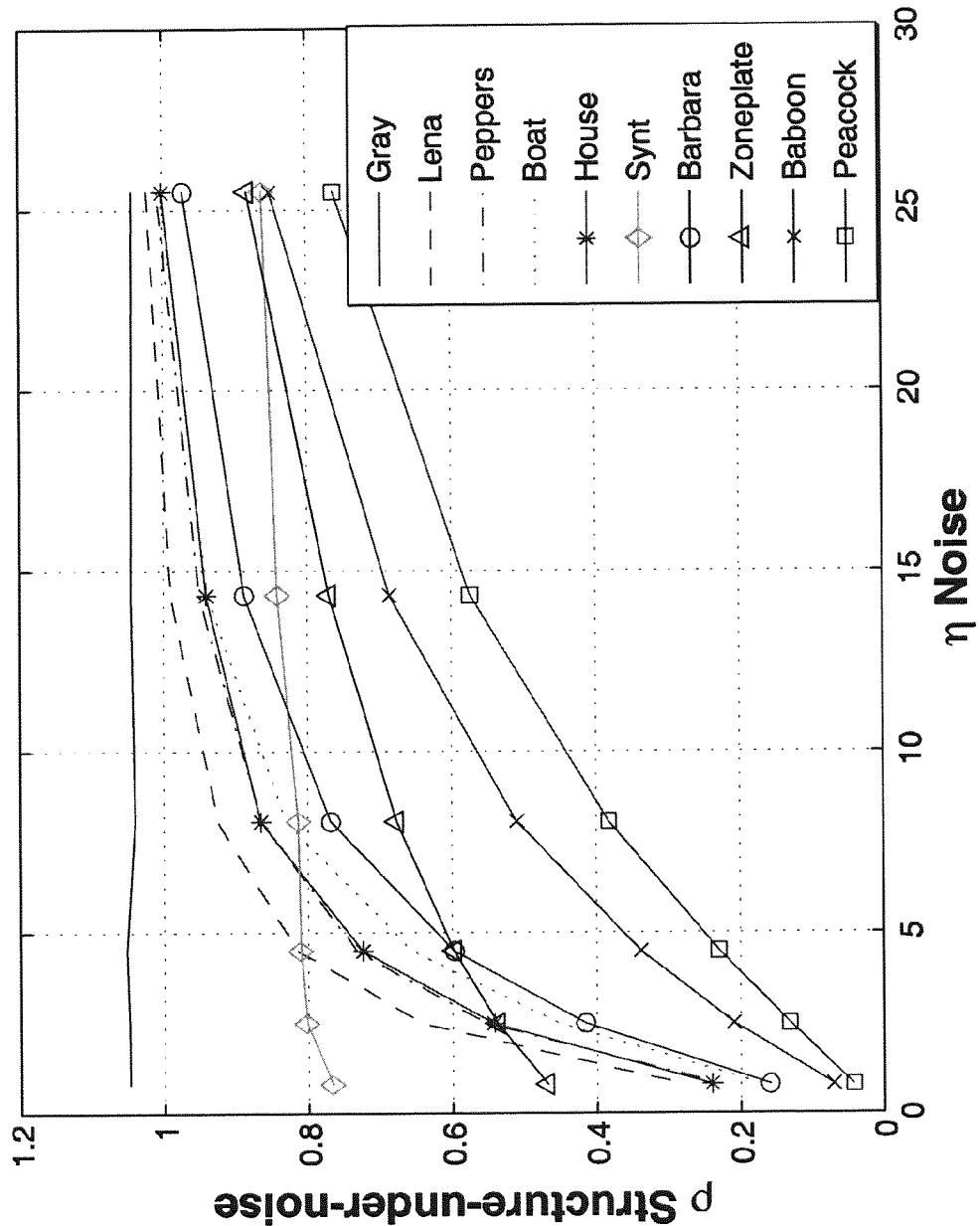
FIG. 4 is an exemplary graph illustrating the relation between noise and structure-under-noise for several of images 3a-3m.

FIG. 4 shows how the proposed structure-under-noise estimator well distinguishes between the selected test images under different noise η. Small ρ means higher structure than noise. High ρ means the noise dominates the image structure (i.e., is more visible). For example, in FIG. 3j, ρ≅1 for all noise levels because the image has no structure, while in FIG. 3i, ρ is small for little noise and increases with increased noise but does not exceed one because the structure is more visible than the noise.

While MAD is used to estimate noise-under-structure, it will be understood that alternative structure estimators, such as ***, may also be used.

Referring back to FIG. 2, having obtained ρ, it is now possible to determine the number of iterations N and the time step λ in steps 204 and 206, respectively.

While the number of iterations N in equation (3) expresses the number of scales in the scale space, T in equation (2*) represents the distance between the first and last scale. N and T are related through T=λ·N. For a certain amount of noise, the required T to optimally noise reduce an image is similar for appropriately selected values of N and λ. We thus determine λ and N and then find T (step 208).

Figure 5:
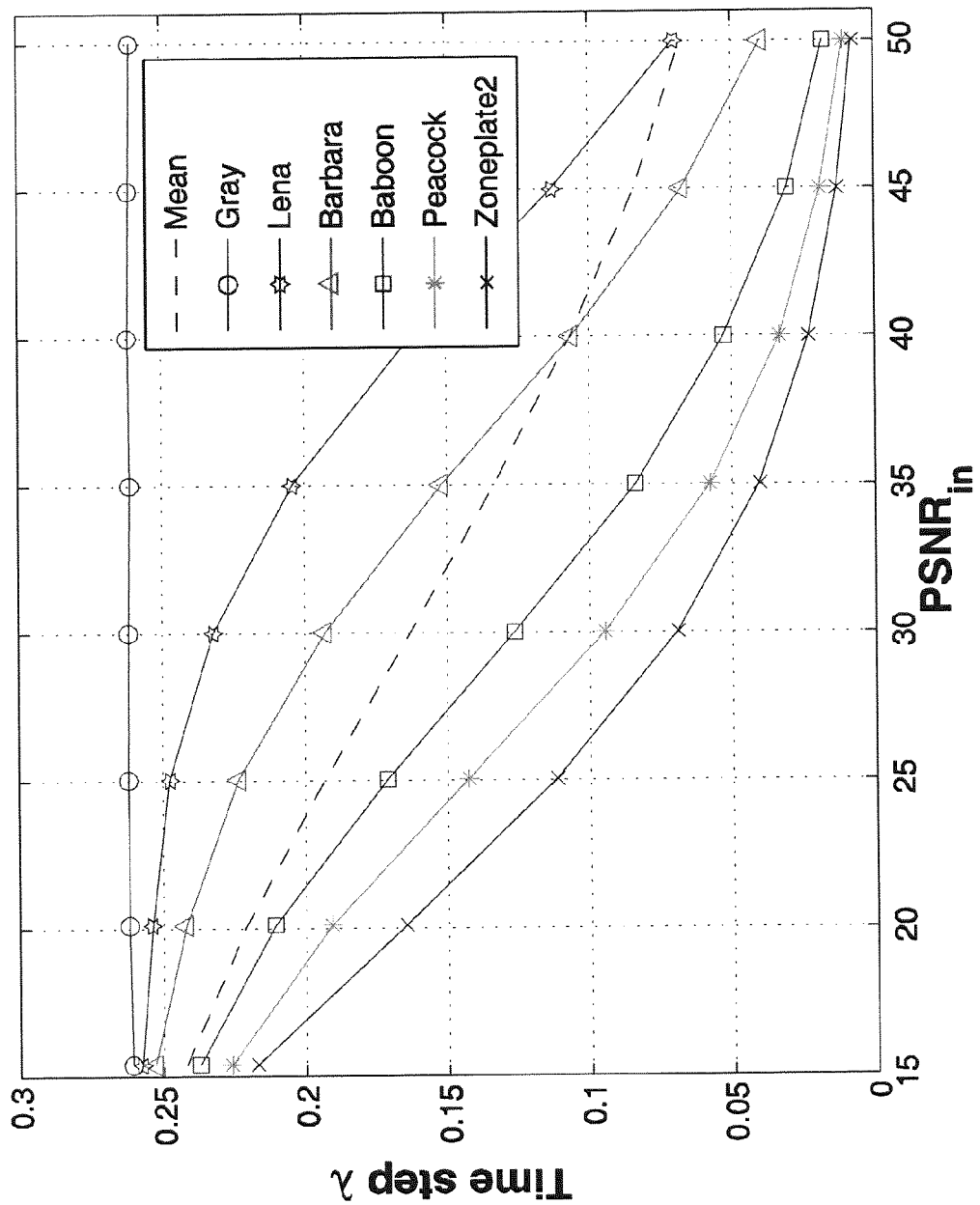
FIG. 5 is an exemplary graph illustrating time step versus noise for several of images 3a-3m.

In one embodiment, λ is determined using:

$$\lambda = \rho \cdot \lambda_{max}, \quad (12)$$

where $\lambda_{max}$ is defined by $$\lambda_{max} \leq \frac{1}{|W|}$$

and ρ as in (10). FIG. 5 shows how λ is properly adaptive to both noise and image structure: a) for a specific noise level, the less texture the image contains, the higher λ should be set, i.e., high frequencies require smaller time step; b) for a certain image structure, λ increases proportionally to the added noise.

The maximum number of iterations N required to reduce noise is related to the maximum assumed noise, but the N required for a specific image should be proportional to the amount of noise and structure present in that image. Therefore, in one embodiment, N is determined using:

$$N = \rho \cdot \sqrt{\eta_{max}} \quad (13)$$

where $\eta_{max}$ is the maximum possible noise standard deviation (e.g., $\eta_{max}$=80 corresponding to a PSNR=10 dB). With (12) and (13), we can then obtain T (step 208) as follows:

$$T = \rho^2 \cdot \lambda_{max} \cdot \sqrt{\rho_{max}} \quad (14)$$

Figure 6:
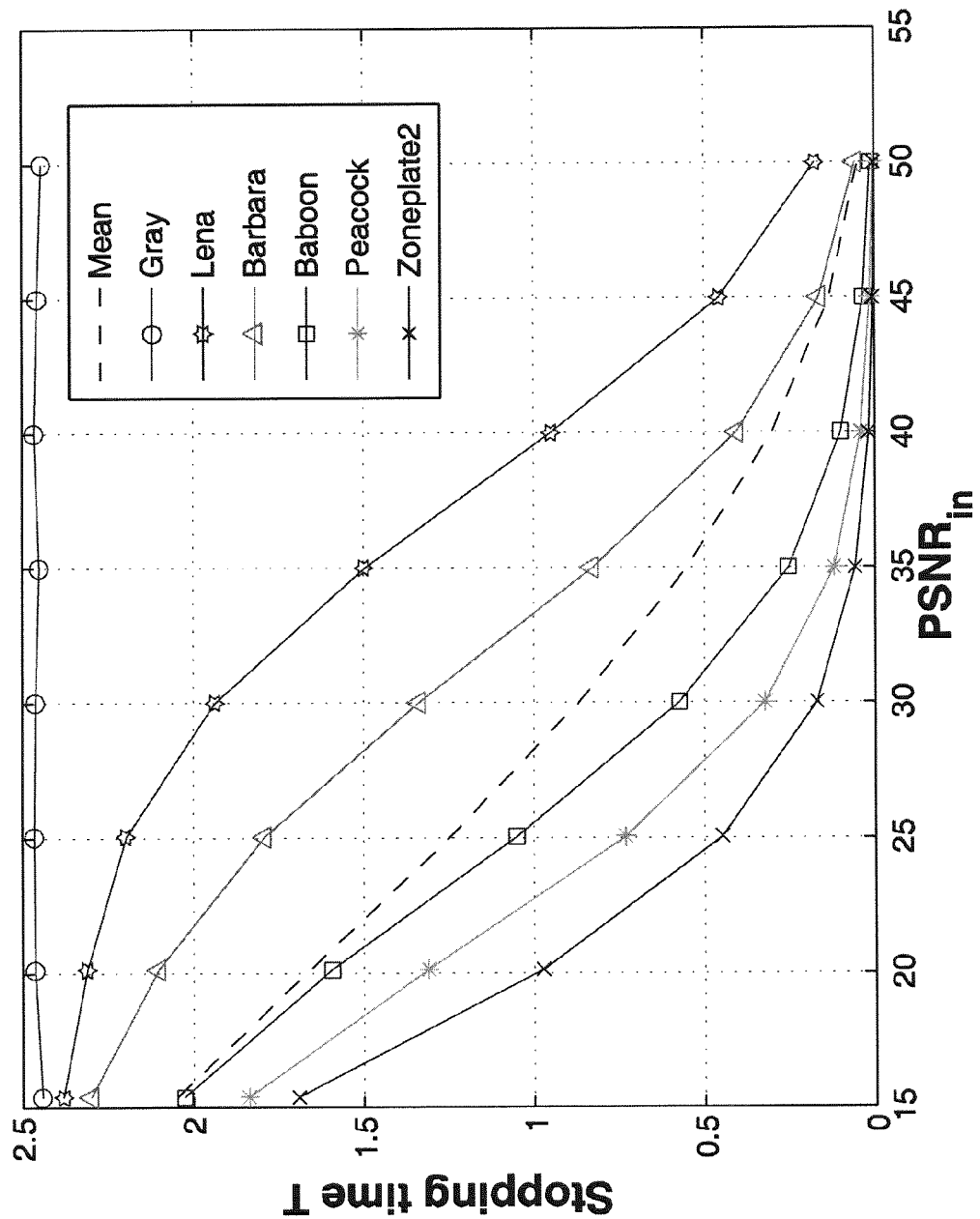
FIG. 6 is an exemplary graph illustrating stopping time versus noise for several of images 3a-3m.

As expected, T is proportional to both noise and image structure. FIG. 6 displays this non-linear relation between T and η for several images. As illustrated, T distinguishes between images of different structures and of different noise levels.

Having obtained T, and already knowing ρ and η, we can then estimate edge-strength σ as follows:

$$\sigma = \frac{1}{\sqrt{T}} \cdot \eta + 0.25\rho \cdot \frac{1}{\sqrt{T}} \cdot \eta. \quad (15)$$

Equation (15) is based on the following principles:
1. σ and noise: Higher noise level requires higher σ and more smoothing risks image blurring especially for high structure images. Therefore, a compromise should be considered to balance between the noise level and the image structure.
2. σ and T: With T=λ·N, σ and T are inversely proportional. This is because for a fixed λ, decreasing σ means narrower G(•) and consequently higher N is required to noise reduce an image. On the other hand, for a fixed N, increasing λ requires reducing σ to avoid losing image details.
3. Semigroup property: The semigroup property, and other architectural properties, are associated with AD as per equation (3). A process P of parameters $\sigma_1$, $\sigma_2$, and $\sigma_3$ possess the semigroup property if:

$$P\{P\{I,\sigma_1\},\sigma_2\} = P\{I,\sigma_3\}; \sigma_3 = \text{function}(\sigma_1,\sigma_2).$$

So assuming we need $N_a$ iterations to optimally denoise $I^0$ with an edge strength $\sigma_a$. With the semigroup property, we can find $\sigma_b$=function($\sigma_a$) with $N_b < N_a$. The value of $\sigma_b$ needs to be high enough to noise reduce the image, and low enough not to over smooth it.

Figure 7:
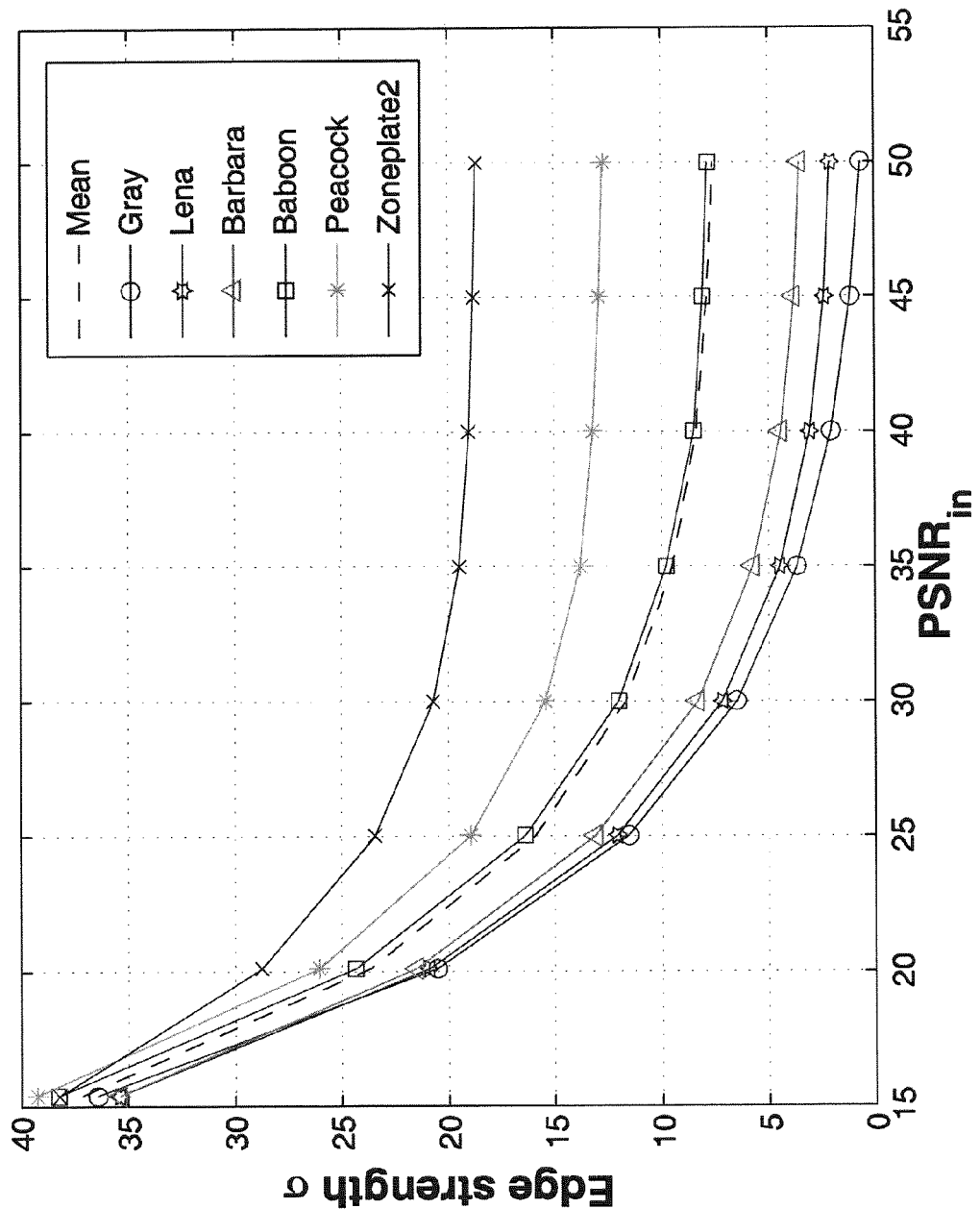
FIG. 7 is an exemplary graph illustrating edge-strength versus time for several of images 3a-3m.

FIG. 7 shows that σ is proportional to the image structure (including noise): for heavy noise, it takes similar values for different images; for little noise, it decreases—but we note that σ is higher for higher structure. Still, the image will not be blurred due to the inverse proportionality between σ and λ. As an example, contrast "Lena" (FIG. 3c) and "Peacock" (FIG. 3i) for 30 dB: $\sigma_{Peacock}$=15 and $\sigma_{Lena}$=6 while $\lambda_{Peacock}$=0.06 and $\lambda_{Lena}$=0.21.

Figure 3A:
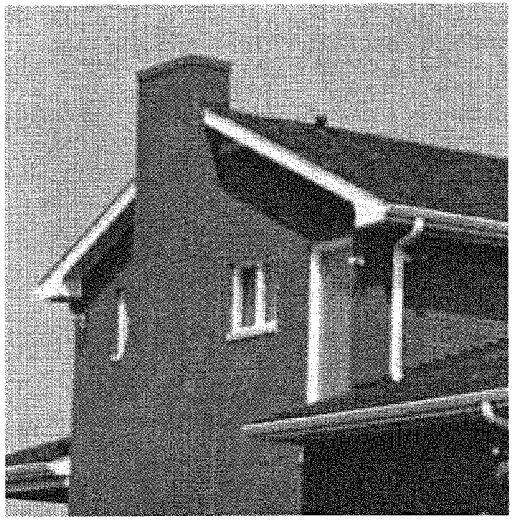
FIGS. 3a-3m are exemplary images to be denoised, in accordance with an embodiment.
Figure 3B:
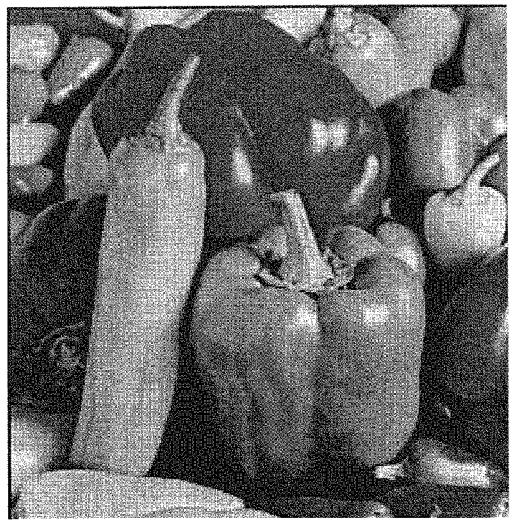
Figure 3C:
Figure 3D:
Figure 8:
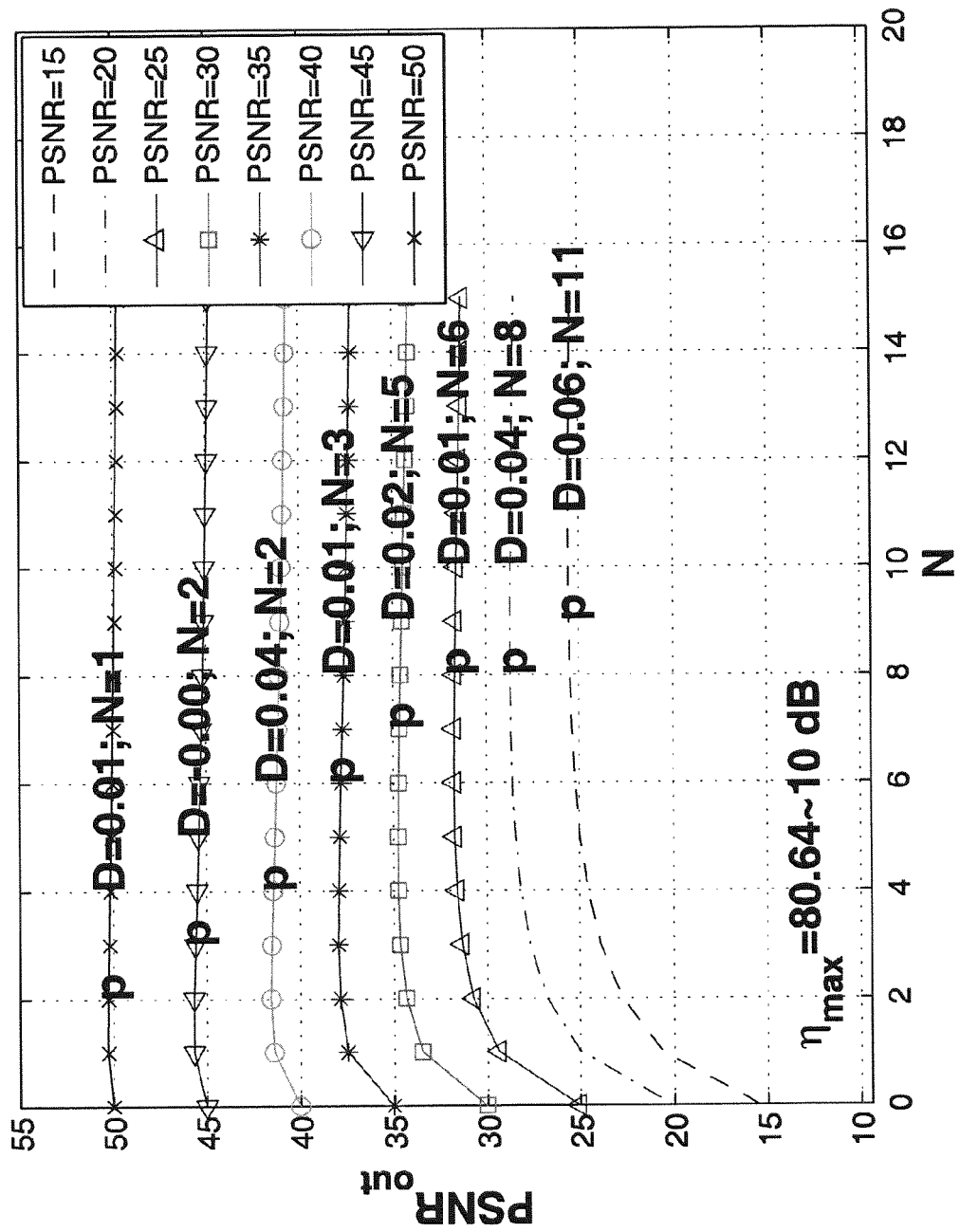
FIG. 8 is an exemplary graph illustrating PSNR output versus number of iterations for several values of PSNR for FIG. 3b.

To see the effect of choosing $N > N_{proposed}$, FIG. 8 shows an example, as applied to FIG. 3b, where varying $N_{proposed} \leq N \leq N_{max}$ does not significantly affect the output PSNR, i.e., $N > N_{proposed}$ is computationally more expensive while not necessarily achieving higher noise reduction. Note that in the figure, the estimated N is similar in PSNR to the N that gives highest output PSNR.

Table 2 shows that increasing N will consequently decrease σ in (15). With the proposed dependency between N, T, and σ, the output PSNR will be similar for different N. However, with high N, e.g. 55, σ becomes small, which decreases the PSNR. We note that λ with different values for N is the same for a certain noise level.

TABLE 2

| N | T | λ | σ | PSNR |
|---|---|---|---|---|
| 4 | 0.9216 | 0.2304 | 10.3349 | 35.0863 |
| 8 | 1.8433 | 0.2304 | 7.3079 | 34.8685 |
| 20 | 4.6082 | 0.2304 | 4.6219 | 34.1515 |
| 55 | 12.6725 | 0.2304 | 2.7871 | 33.3500 |

Figure 3E:
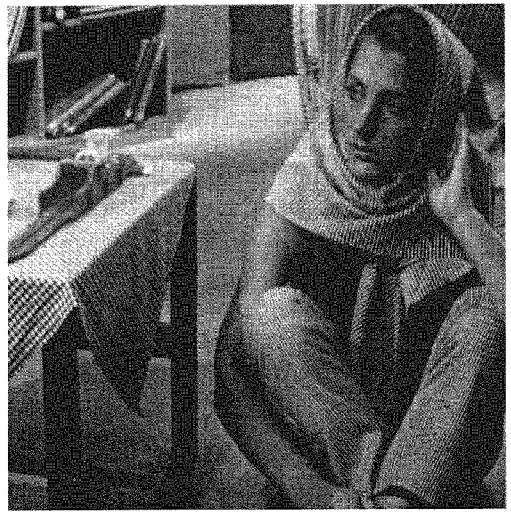
Figure 3F:
Figure 3G:
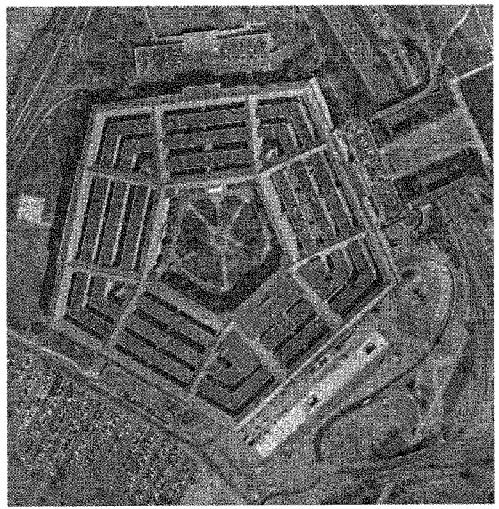
Figure 3H:
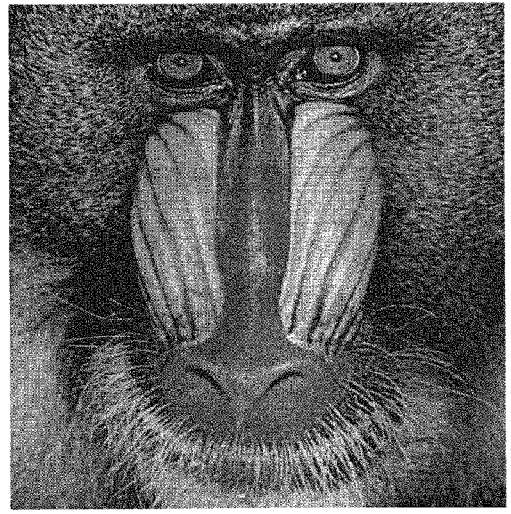
Figure 3I:
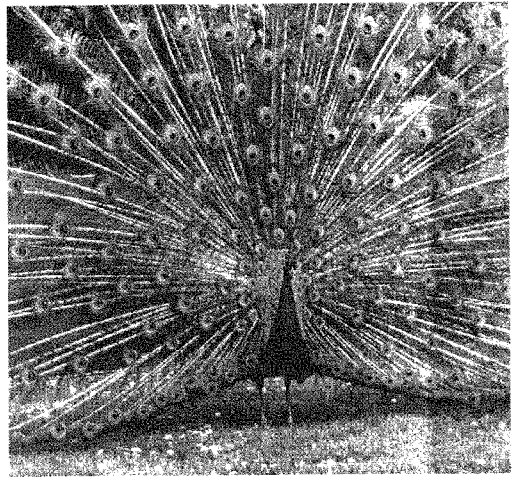
Figure 3J:
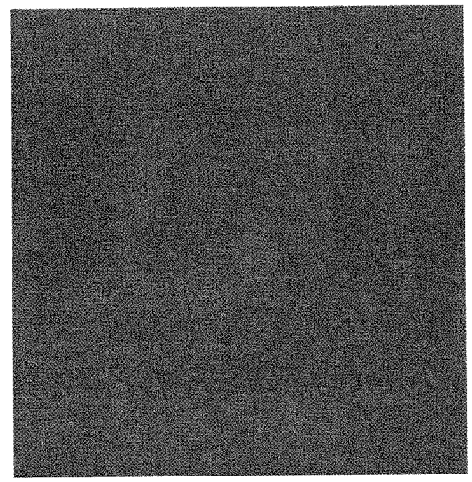
Figure 3K:
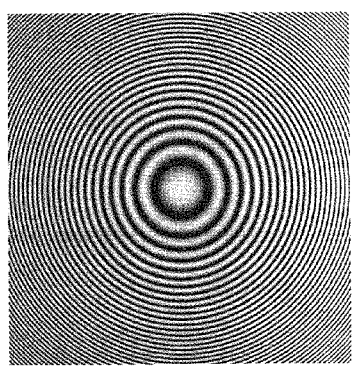
Figure 3L:
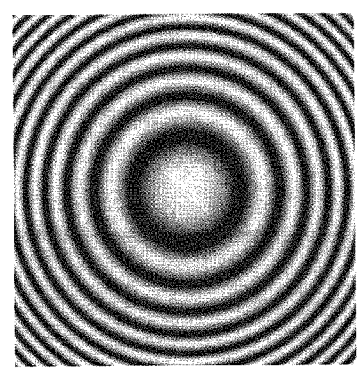
Figure 3M:
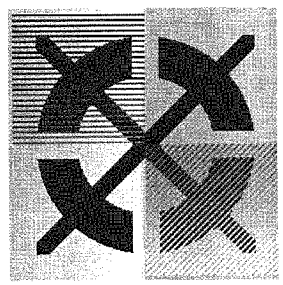
Figure 9:
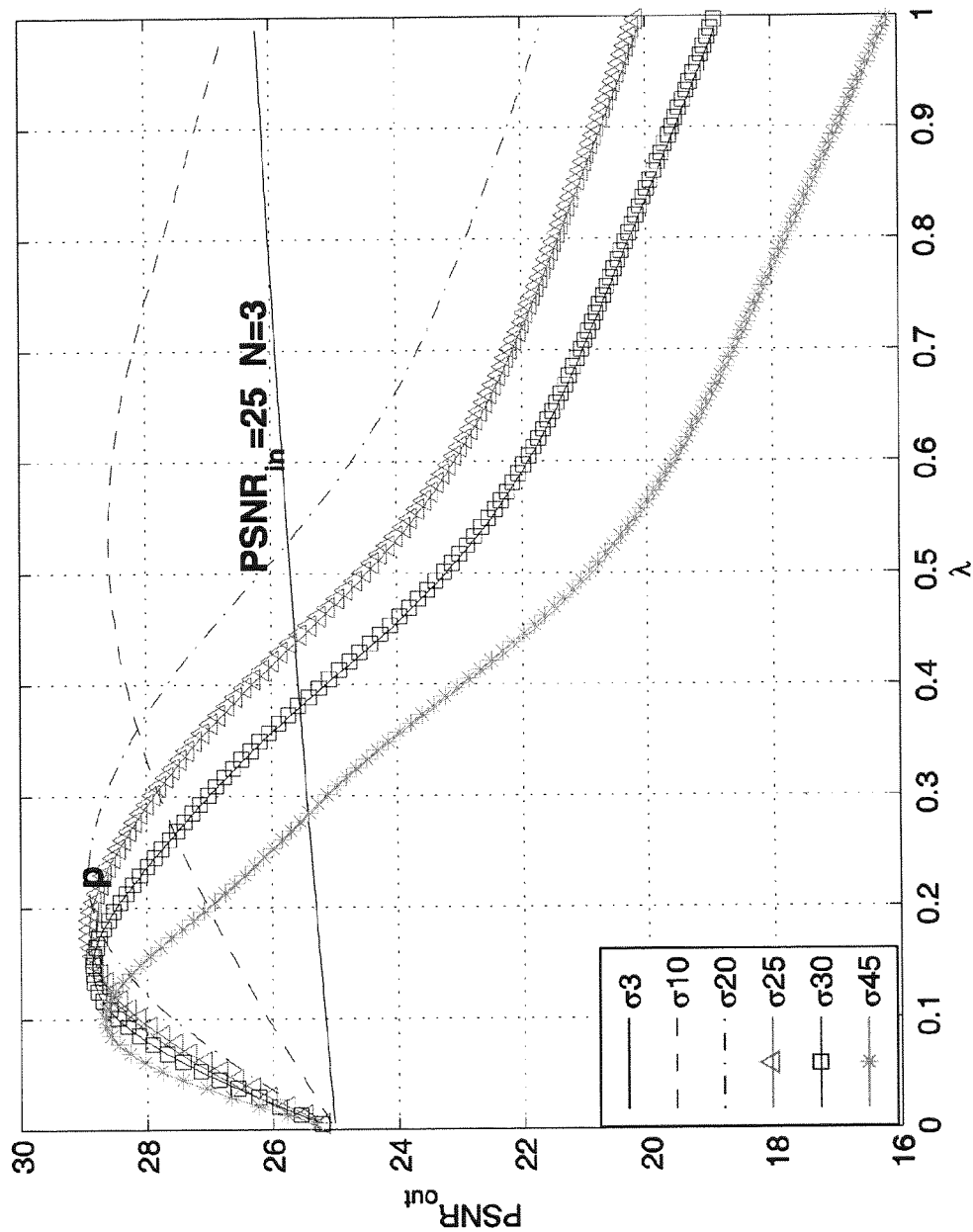
FIG. 9 is an exemplary graph illustrating PSNR output versus time step for FIG. 3e.

With regards to the dependency between λ and σ for a low N, FIG. 9 shows that, as applied to FIG. 3e, for a certain noise level, when the value of σ and λ are not synchronized, i.e., not reaching an optimal T, then we cannot reach the optimal PSNR, for example, when σ=10 and λ=0.1. However, using the MIAD, a nearly optimal PSNR (indicated "p" in the figure) can be reached.

The effect of the dependency between σ and T (and consequently λ) on edge-stopping functions is shown by substituting equation (15) in the equation of any classical G(σ). The result is an adaptive edge-stopping behavior, which we derive here for Lorentzian function (equation (6)) as an example:

$$G_{AdLor}(\nabla I_p, \lambda) = \cfrac{1}{1 + \cfrac{T}{(1+0.25 \cdot \rho)^2 \cdot \eta^2} \cdot (\nabla I_p)^2} \quad (16)$$

Figure 10A:
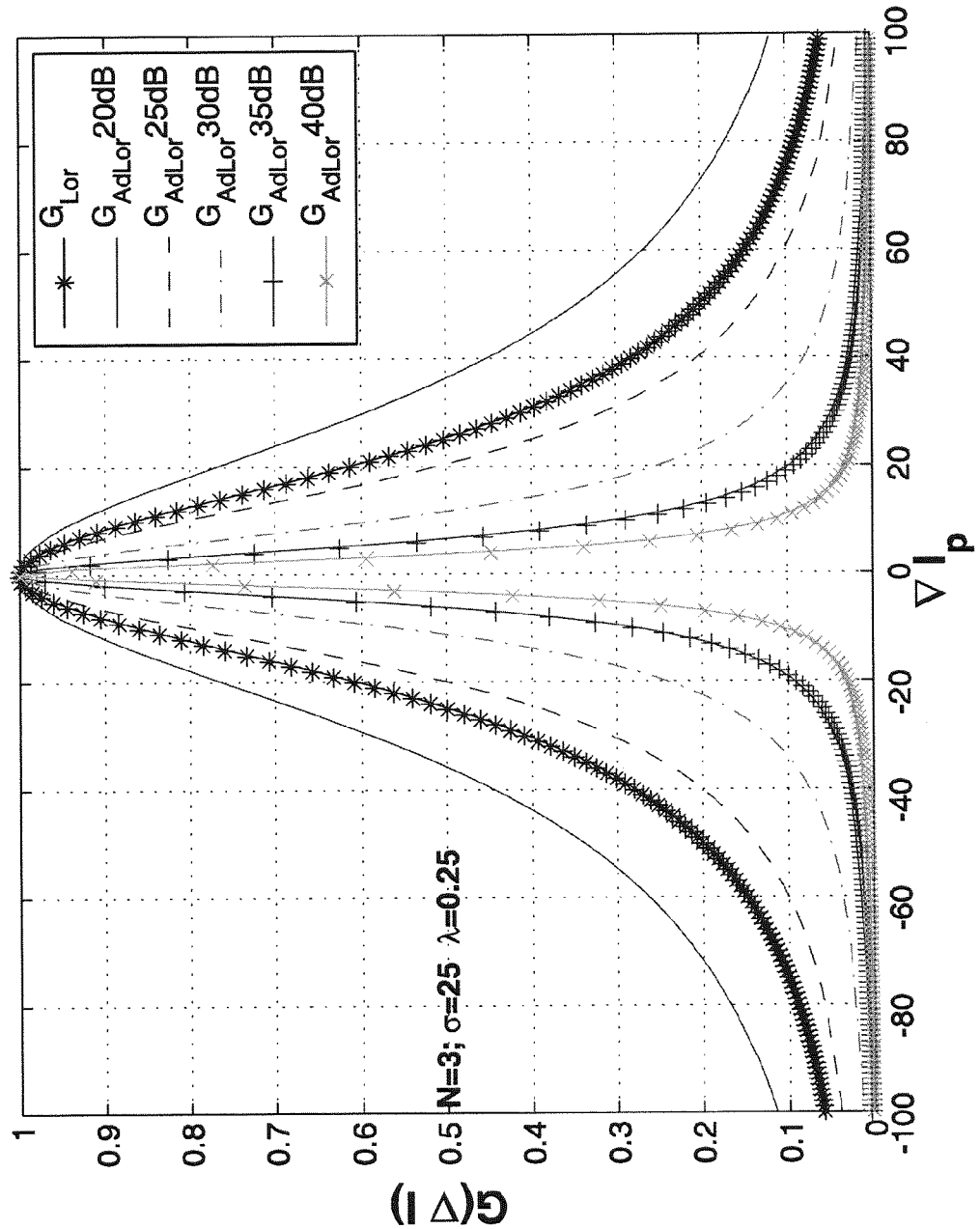
FIGS. 10a and 10b are exemplary graphs of a standard Lorentzian function versus an adaptive Lorentzian function for different time step values.
Figure 10B:
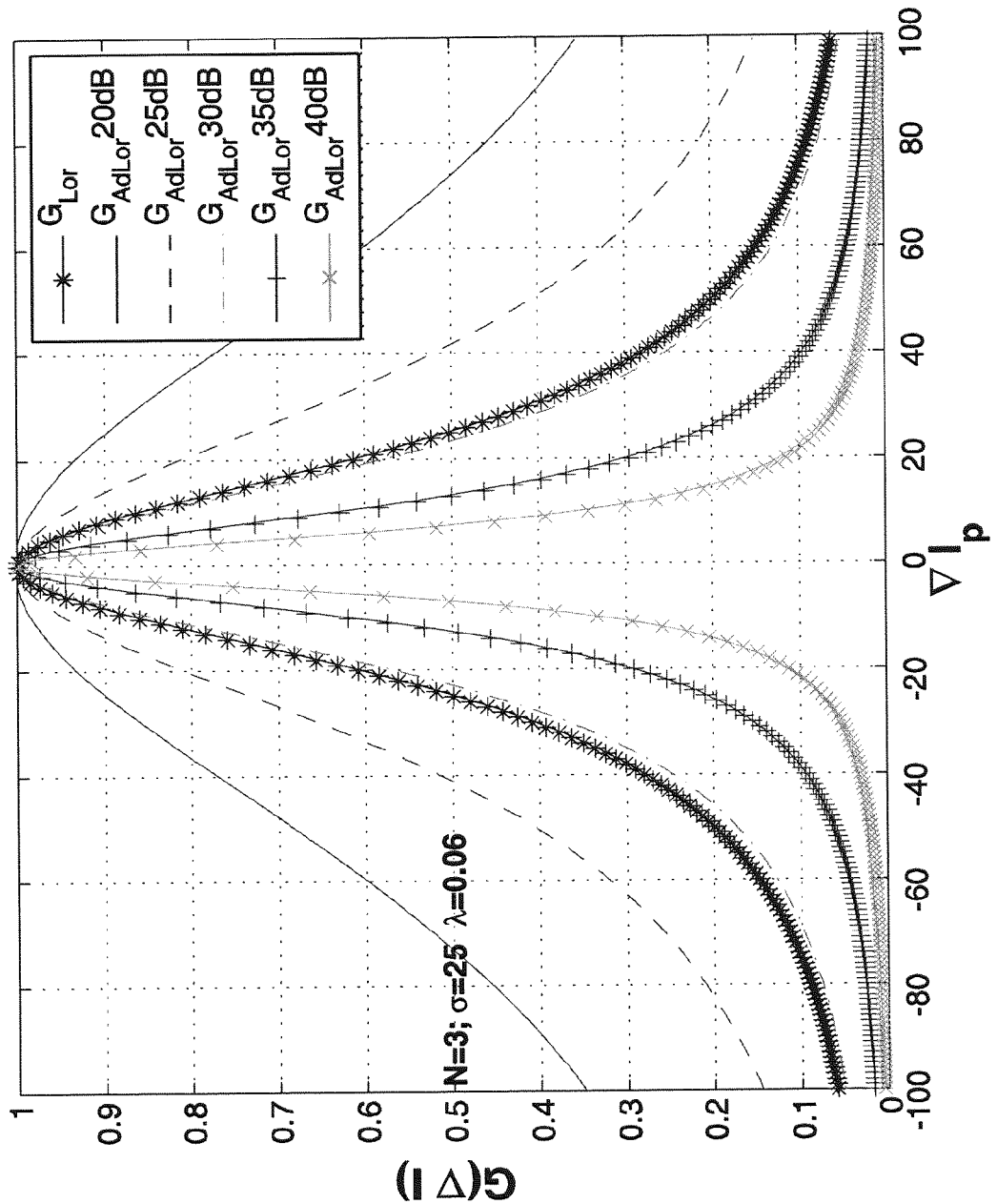

As shown in FIGS. 10a and 10b, this adaptive Lorentzian function, when compared to the original Lorentzian function, is adjusted to image structure and noise: for high noise, the edge-stopping function is required to be more forgiving, i.e., wider, to permit more smoothing. We also note the dependency on λ: G(•) gets narrower for high λ. For example, when λ=0.25 (see FIG. 10a), the function becomes more responsive to edges, and consequently less smoothing occurs. But when λ=0.06 (see FIG. 10b) with the same N and σ, G(•) becomes more forgiving to edges. With MIAD, the dependency between, σ, T and G(•) keeps a stable noise reduction performance, and maintains the optimal PSNR despite changes in λ or σ.

Figure 11:
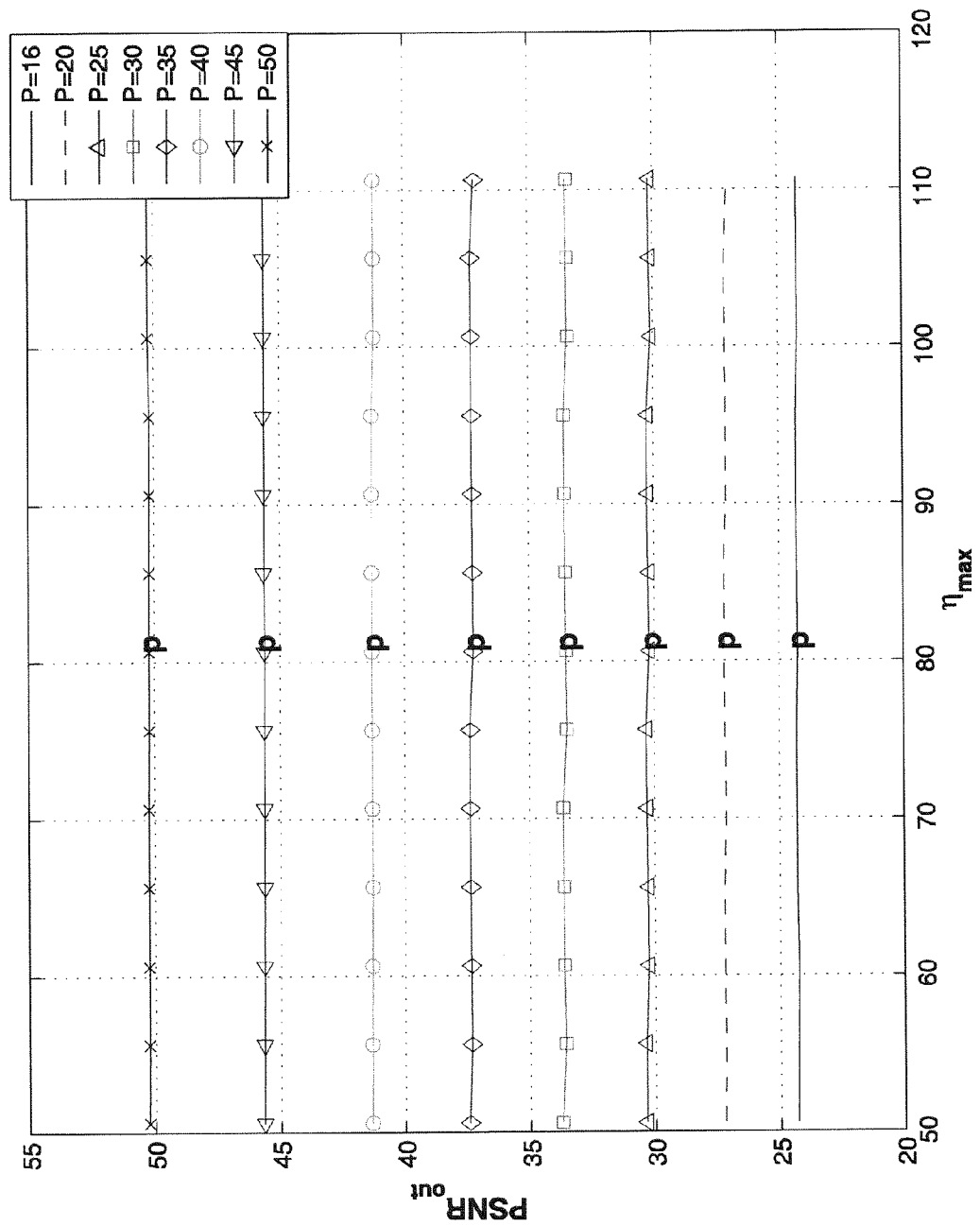
FIG. 11 is an exemplary graph showing the performance of MIAD for different noise levels.
Figure 12A:
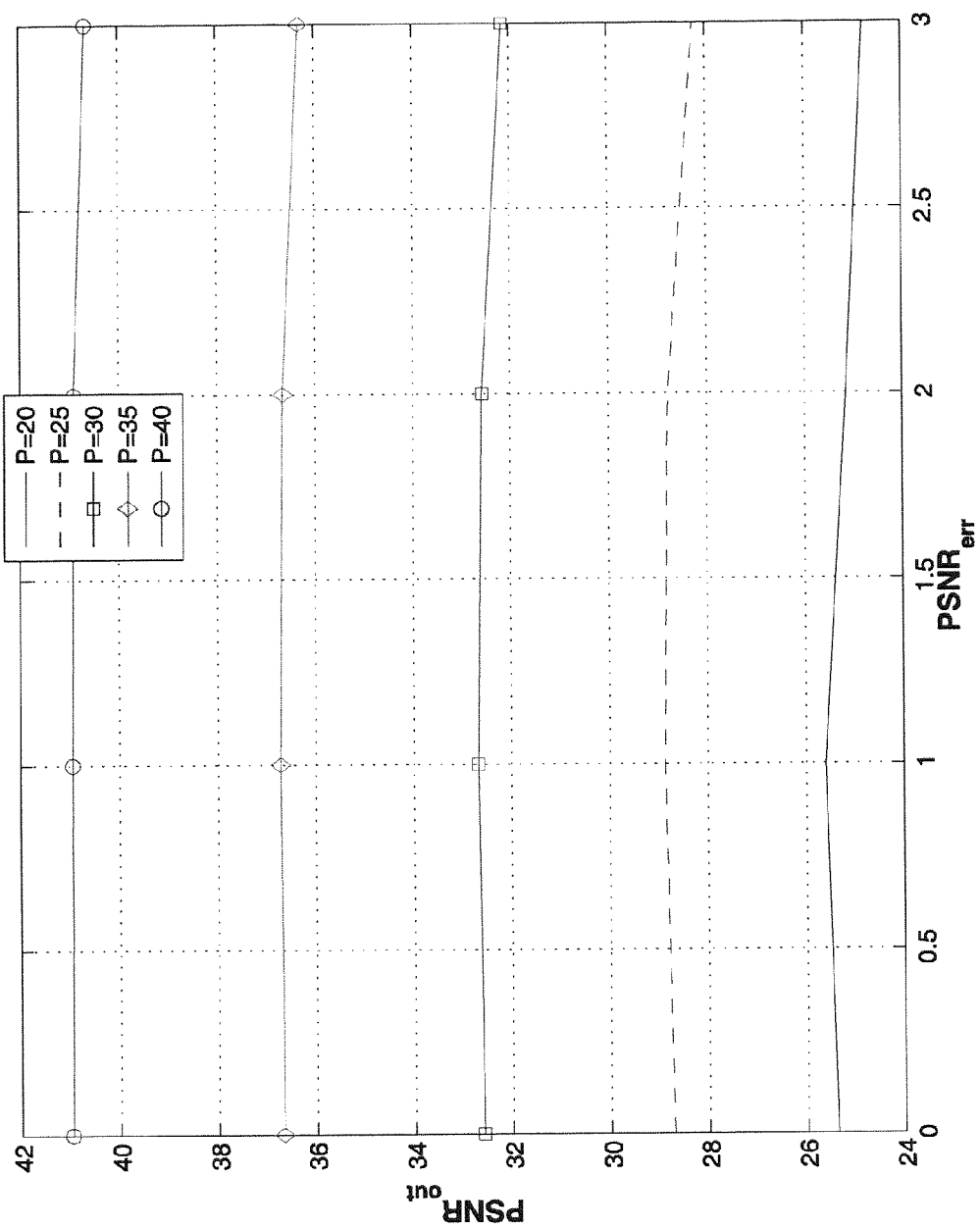
FIGS. 12a and 12b are exemplary graphs that show that the MIAD method is not sensitive to errors in noise estimation up to 3 dB, as applied to FIGS. 3e (FIG. 12a) and 3h (FIG. 12b)
Figure 12B:
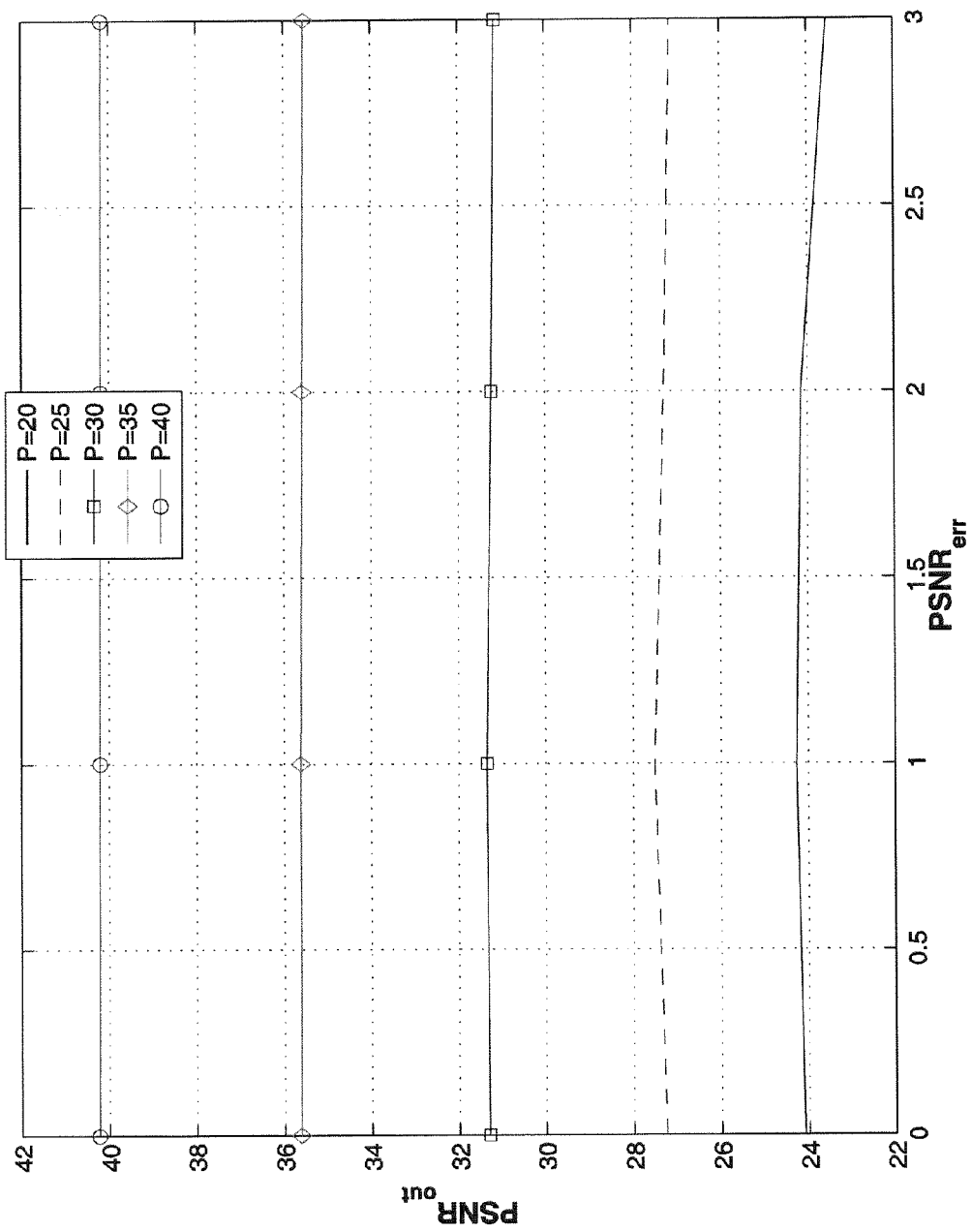

Experiments were performed on a variety of gray-scale images, as shown in FIGS. 3a-3m, with different structures and noise levels. In the simulations, W={North, South, East, West}, and MAD was calculated in the North directions, $MAD_N$. To account for image gradient in other directions, one could use, e.g., max{$MAD_p$, p∈W}. Due to parameter dependency, MIAD is stable, i.e., not too dependent on the selection of $\eta_{max}$ in equation (14). FIG. 11 illustrates that varying $\eta_{max}$ between 50 and 110 does not significantly affect the output PSNR. The MIAD method requires one input parameter, the noise standard deviation η, which can be estimated using a fast noise estimator, as explained above. FIGS. 12a and 12b show that the MIAD method is not sensitive to errors in noise estimation up to 3 dB, as applied to FIGS. 3e (see FIG. 12a) and 3h (see FIG. 12b). Simulations were performed using Matlab under Linux operating system (2 Dual-Core AMD Opteron Processor 8216 1000 MHz).

Figure 13:
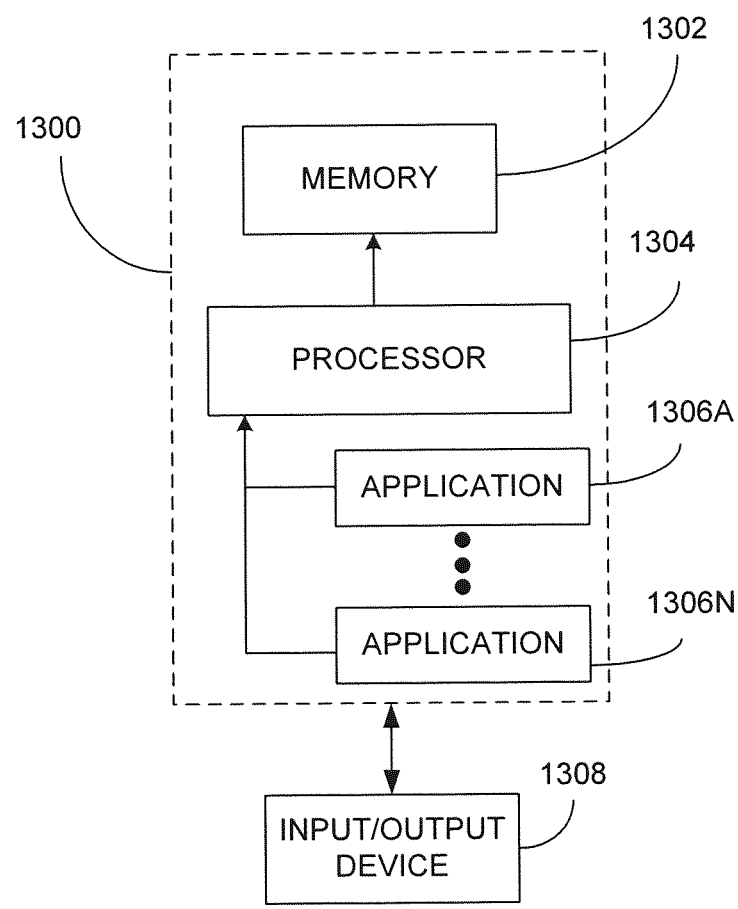
FIG. 13 is a block diagram of a computer system for embodying the MIAD method, in accordance with one embodiment.

The MIAD method can be embodied in a system, a computer readable medium or an electrical or electro-magnetic signal. Referring to FIG. 13, there is illustrated a computer system 1300 for executing the MIAD method. The computing system 1300 comprises, amongst other things, a plurality of applications 1306a . . . 1306n running on a processor 1304, the processor being coupled to a memory 1302. It should be understood that while the applications 1306a . . . 1306n presented herein are illustrated and described as separate entities, they may be combined or separated in a variety of ways.

One or more databases (not shown) may be integrated directly into memory 1302 or may be provided separately therefrom and remotely from the computer system 1300. In the case of a remote access to the databases, access may occur via any type of network, such as the Internet, the Public Switch Telephone Network (PSTN), a cellular network, or others known to those skilled in the art. The various databases described herein may be provided as collections of data or information organized for rapid search and retrieval by a computer. They are structured to facilitate storage, retrieval, modification, and deletion of data in conjunction with various data-processing operations. They may consist of a file or sets of files that can be broken down into records, each of which consists of one or more fields. Database information may be retrieved through queries using keywords and sorting commands, in order to rapidly search, rearrange, group, and select the field. The databases may be any organization of data on a data storage medium, such as one or more servers.

In one embodiment, the databases are secure web servers and Hypertext Transport Protocol Secure (HTTPS) capable of supporting Transport Layer Security (TLS), which is a protocol used for access to the data. Communications to and from the secure web servers may be secured using Secure Sockets Layer (SSL). An SSL session may be started by sending a request to the Web server with an HTTPS prefix in the URL, which causes port number "443" to be placed into the packets. Port "432 is the number assigned to the SSL application on the server. Identity verification of a user may be performed using usernames and passwords for all users. Various levels of access rights may be provided to multiple levels of users.

Alternatively, any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

The memory 1302 accessible by the processor 1304 receives and stores data. The memory 1302 may be a main memory, such as a high speed Random Access Memory (RAM), or an auxiliary storage unit, such as a hard disk, a floppy disk, or a magnetic tape drive. The memory may be any other type of memory, such as a Read-Only Memory (ROM), or optical storage media such as a videodisc and a compact disc.

The processor 1304 may access the memory 1302 to retrieve data. The processor 1304 may be any device that can perform operations on data. Examples are a central processing unit (CPU), a front-end processor, a microprocessor, a graphics processing unit (GPU/VPU), a physics processing unit (PPU), a digital signal processor, and a network processor. The applications 1306a . . . 1306n are coupled to the processor 1304 and configured to perform various tasks as explained below in more detail. An output may be transmitted to an output device 1308.

Figure 14:
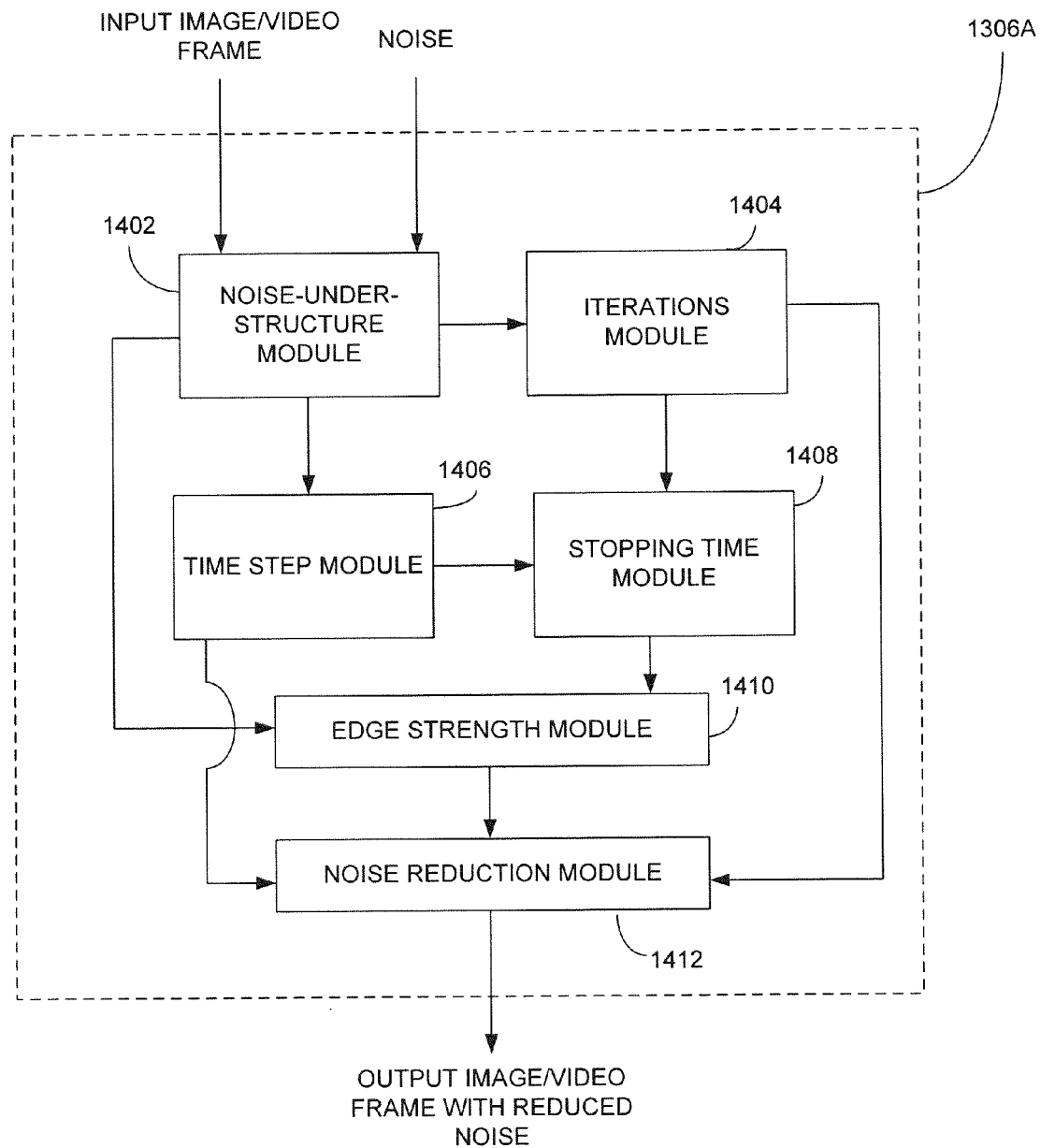
FIG. 14 is a block diagram of an exemplary application running the MIAD method on the processor of FIG. 13.

FIG. 14 illustrates an exemplary application 1306a running on the processor 1304. The application 1306a comprises a plurality of modules that together perform the noise reduction procedure on a received input image/video frame. An input image/video frame is received by a structure-under-noise module 1402. The structure-under-noise module 1402 uses data from the received image/video frame and a previously determined noise level to perform a structure measure and determine the structure-under-noise ρ:

$$\text{structure} - \text{under} - \text{noise} = \frac{\text{noise}}{\text{structure\_measure}}$$

The determined structure-under-noise value is provided to an iterations module 1404 and a time step module 1406. The iterations module 1404 multiplies the noise-under-structure value by a constant representing a maximum noise level to obtain a number of iterations N for the denoising procedure. The maximum noise level constant may be set to a value ranging from about 50 and about 100. In one embodiment, the maximum noise level constant is set to 80, which corresponds to a PSNR of 10 dB. This value is chosen to obtain a number of iterations N that ranges from 0 to about 15.

The time step module 1406 multiplies the noise-under-structure value by a constant representing a theoretical limit for the time step. The theoretical limit constant may be set to a value ranging from about 0.2 to about 0.35 and in one embodiment, is set to 0.25. The iterations module 1404 and the time step module 1406 will then provide a number of iterations and a time step value, respectively, to a stopping time module 1408. The stopping time module 1408 is used to obtain an "analog" value of the number of iterations, by multiplying the number of iterations with the time step. Once the stopping time is obtained, it is provided to an edge strength module 1410 that also receives the noise-under-structure value previously determined by the noise-under-structure module 1402. The edge strength is determined using:

$$\sigma = \frac{1}{\sqrt{T}} \cdot \eta + 0.25\rho \cdot \frac{1}{\sqrt{T}} \cdot \eta.$$

Having obtained the number of iterations, the time step, and the edge strength, the noise reduction module 1412 is provided with these values and a noise reduction process is performed in accordance with equation (3).

Figure 15:
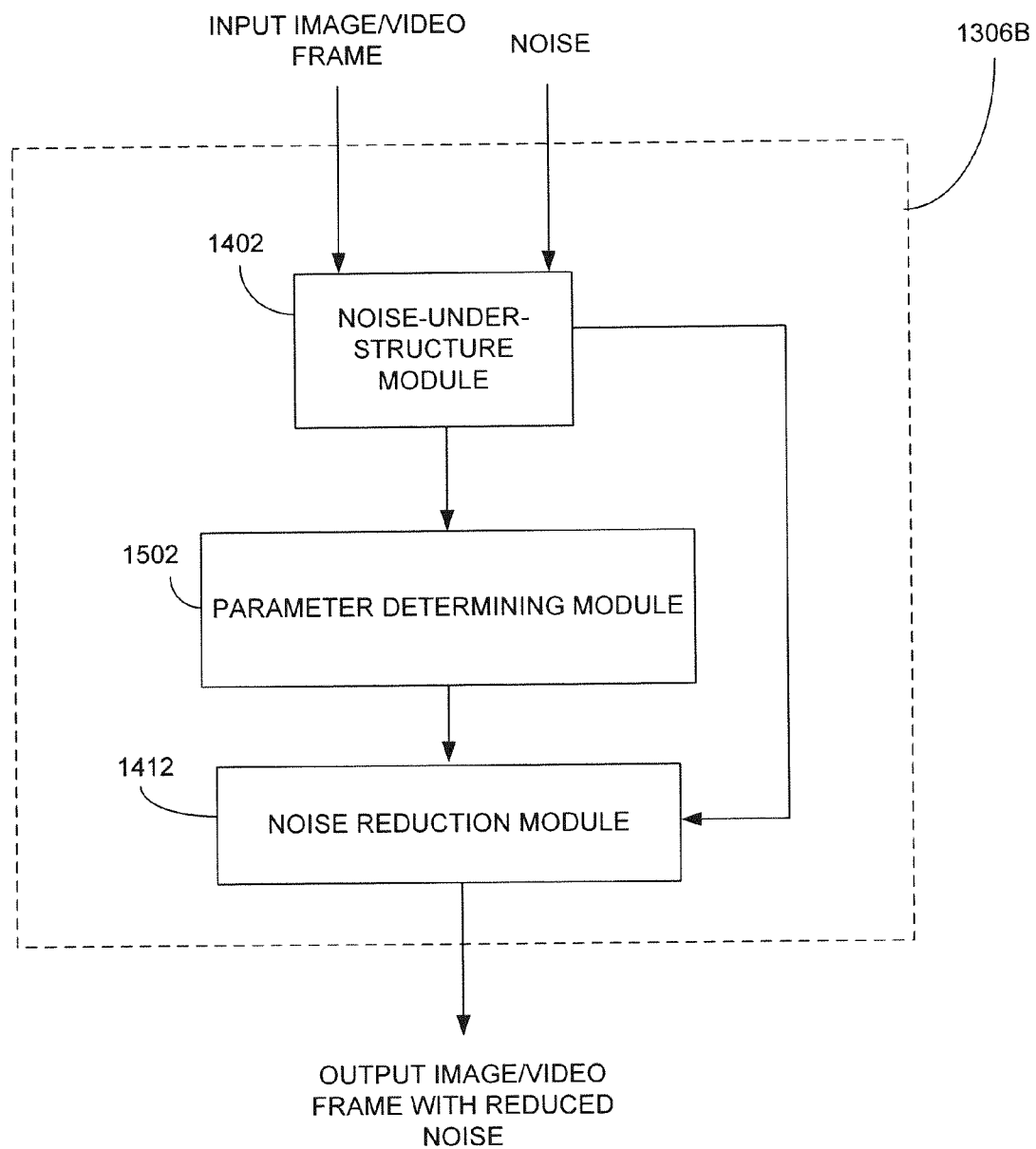
FIG. 15 is a block diagram of an alternative application running the MIAD method on the processor of FIG. 13.
Figure 16:
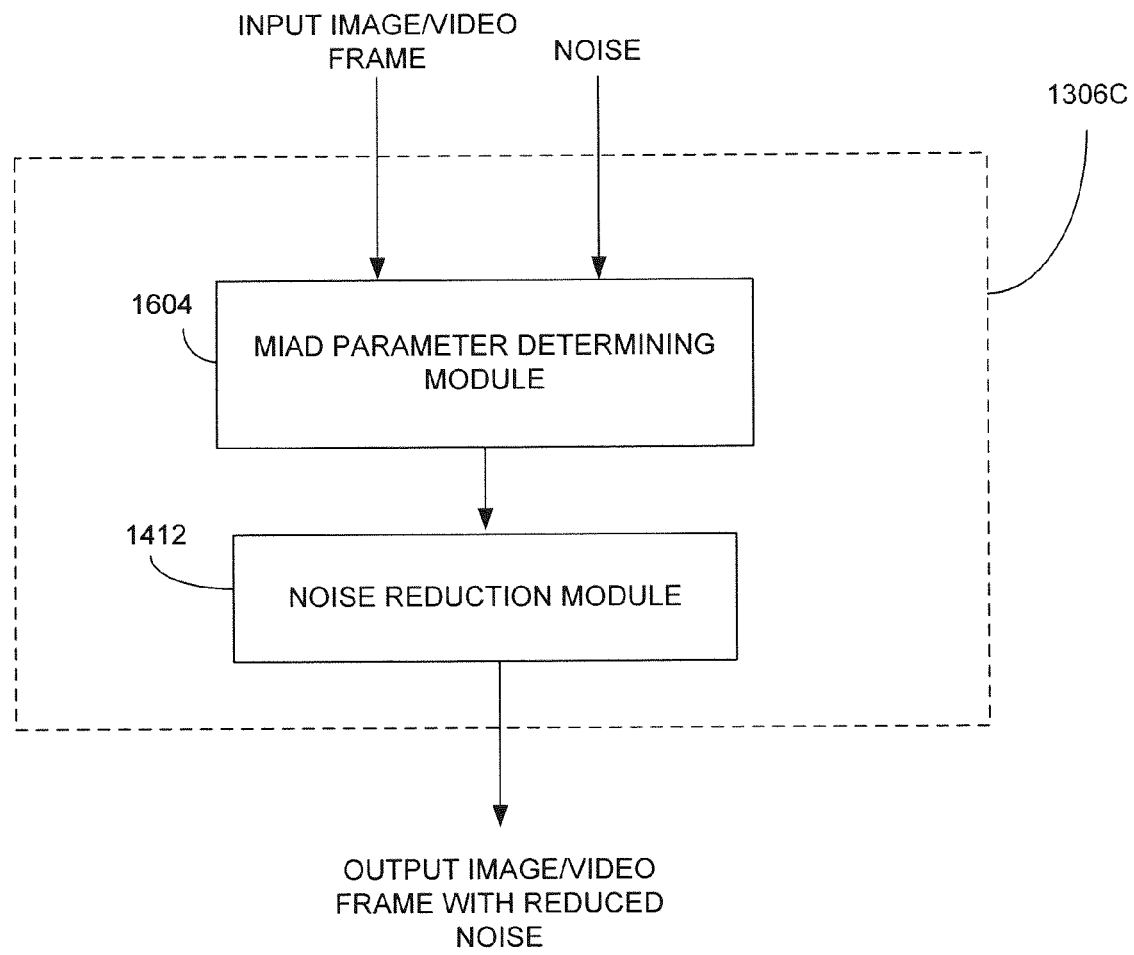
FIG. 16 is a block diagram of yet another alternative application running the MIAD method on the processor of FIG. 13.

An alternative embodiment for application 1306a is illustrated in FIG. 15 as application 1306b. In this embodiment, the noise-under-structure module 1402 operates similarly to that illustrated in FIG. 14, but all other parameters for the MIAD are determined in a single parameter determining module 1502. The parameters are then provided to a noise reduction module 1412 and applied as per FIG. 14. FIG. 16 illustrates yet another alternative embodiment as application 1306c. A single MIAD parameter determining module 1604 is used to perform all of the calculations and estimations necessary to obtain the parameters for the MIAD, which are then applied to the noise reduction module 1412 as above.

The computing system 1300 may be customized with the number of applications desired. For example, a plurality of applications that together perform the functions of applications 1306a, 1306b, or 1306c may be provided. In addition, it should be understood that the modules may be provided in other alternative manners, by combining and/or separating various features as desired. The function illustrated in step 102 of FIG. 1 may also be integrated within an application that performs the MIAD denoising process, or it may provided as a separate application that interfaces with the MIAD denoising application(s).

The denoised image may be stored in memory 1302. The input images/video frames may also be stored in memory 1302. In addition, the parameters determined by the modules of FIGS. 14, 15, and 16 may also be stored in memory 1302. An intermediary and/or final results of the MIAD denoising process may be sent to input/output device 1308.

While the present description refers to equation (3) for the discretization of equation (2), other discretization methods providing other discretized AD equation may used. For example, explicit, implicit, or semi-explicit discretization methods may be used. While the present description refers to the determination of the stability parameter λ, the edge strength σ, and the AD equation as a function of the noise standard deviation, it should be understood that the noise variance $\sigma_n^2$ may be used. It should be understood that the present minimal iterativity approach may be applied in other image processing fields such as video filtering, object segmentation or motion estimation, for example. In addition, MIAD can be used in other application areas such as in image compression, medical imaging, video signal filtering, coding-artifact reduction, or speckle-noise filtering, for example.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The embodiments of the invention described above are intended to be exemplary only. The scope of the invention is therefore intended to be limited solely by the scope of the appended claims.

The invention claimed is:

1. A method for reducing noise in an image/video frame, comprising:
    receiving an input image/video frame and a corresponding noise level η;
    determining a structure-under-noise estimator ρ as a function of a ratio between the noise level η and a structure measure parameter for the input image/video frame;
    determining a number of iterations N and a time step parameter λ from the structure-under-noise estimator ρ;
    determining a stopping time parameter T from the number of iterations N and the time step parameter λ;
    determining an edge strength parameter σ from the time step parameter λ, the noise level η, and the stopping time parameter T using:

$$\sigma = \frac{1}{\sqrt{T}} \cdot \eta + \lambda_{max}\rho \cdot \frac{1}{\sqrt{T}} \cdot \eta;$$

denoising the input image/video frame by applying anisotropic diffusion thereto using the edge strength parameter σ, the time step parameter λ, and the number of iterations N, thereby obtaining a denoised image; and
    outputting the denoised image.

2. The method of claim 1, wherein the structure measure parameter is a median absolute deviation of an image gradient (MAD) of the input image/video frame.

3. The method of claim 2, further comprising determining the MAD.

4. The method of claim 1, wherein the corresponding noise level η is an estimated value with an error less than or equal to 3 dB.

5. The method of claim 1, wherein the number of iterations N is from 0 to about 15.

6. The method of claim 1, wherein the number of iterations N is determined by multiplying the structure-under-noise estimator ρ by a constant corresponding to a maximum noise level.

7. The method of claim 6, wherein the maximum noise level is from about 50 dB to about 100 dB.

8. The method of claim 1, wherein the time step parameter λ is obtained by multiplying the structure-under-noise estimator ρ by a constant corresponding to a theoretical maximum time step parameter $\lambda_{max}$.

9. The method of claim 8, wherein the theoretical maximum time step parameter is from about 0.2 seconds to about 0.35 seconds.

10. The method of claim 8, wherein the anisotropic diffusion is applied using:

$$I_s^{n+1} = I_s^n + \lambda \sum_{p \in W} G(\nabla I_p^n, \sigma) \cdot \nabla I_p^n;$$

$$1 \leq n \leq N,$$

where s is a center pixel, n is a current scale, $I_s^n$ is an image intensity at s and n, $I_s^{n+1}$ is a next-scale version of $I^n$, $I^0$ is an input noisy image, and $\nabla I_p = (I_p - I_s)$ is an image gradient in direction p∈W, |W| is a number of nearest neighbors along which the anisotropic diffusion is computed, and $G(\nabla I_p, \sigma)$ is an edge-stopping function in the direction p.

11. A system for reducing noise in an image/video frame having a corresponding noise level η, the system comprising:
    a memory;
    a processor coupled to the memory;
    a parameter determining module stored on the memory and executable by the processor, the parameter determining module having program code that when executed, determines a structure-under-noise estimator ρ as a function of a ratio between the noise level η and a structure measure parameter for the input image/video frame, determines a number of iterations N and a time step parameter λ from the structure-under-noise estimator ρ; determines a stopping time parameter T from the number of iterations N and the time step parameter λ, and determines an edge strength parameter σ from the time step parameter λ, the noise level η, and the stopping time parameter T using;

$$\sigma = \frac{1}{\sqrt{T}} \cdot \eta + \lambda_{max} \rho \cdot \frac{1}{\sqrt{T}} \cdot \eta;\ \text{and}$$

a noise reduction module stored on the memory and executable by the processor, the noise reduction module having program code that when executed, denoises the input image/video frame by applying anisotropic diffusion thereto using the edge strength parameter σ, the time step parameter λ, and the number of iterations N, thereby obtaining a denoised image, and outputs the denoised image.

12. The system of claim 11, wherein the structure measure parameter is a median absolute deviation of an image gradient (MAD) of the input image/video frame.

13. The system of claim 12, wherein the parameter determining module further comprises program code that when executed, determines the MAD.

14. The system of claim 11, wherein the corresponding noise level η is an estimated value with an error less than or equal to 3 dB.

15. The system of claim 11, wherein the number of iterations N is from 0 to about 15.

16. The system of claim 11, wherein the number of iterations N is determined by multiplying the structure-under-noise estimator ρ by a constant corresponding to a maximum noise level.

17. The system of claim 16, wherein the maximum noise level is from about 50 dB to about 100 dB.

18. The system of claim 11, wherein the time step parameter λ is obtained by multiplying the structure-under-noise estimator ρ by a constant corresponding to a theoretical maximum time step parameter $\lambda_{max}$.

19. The system of claim 18, wherein the theoretical maximum time step parameter is from about 0.2 seconds to about 0.35 seconds.

20. The system of claim 18, wherein the anisotropic diffusion is applied using:

$$I_s^{n+1} = I_s^n + \lambda \sum_{p \in W} G(\nabla I_p^n, \sigma) \cdot \nabla I_p^n;$$

$$1 \leq n \leq N,$$

where s is a center pixel, n is a current scale, $I_s^n$ is an image intensity at s and n, $I_s^{n+1}$ is a next-scale version of $I^n$, $I^0$ is an input noisy image, and $\nabla I_p = (I_p - I_s)$ is an image gradient in direction p∈W, |W| is a number of nearest neighbors along which the anisotropic diffusion is computed, and $G(\nabla I_p, \sigma)$ is an edge-stopping function in the direction p.

* * * * *